United States Patent [19]

Reiter et al.

[11] Patent Number: 5,713,020
[45] Date of Patent: Jan. 27, 1998

[54] METHOD AND SYSTEM FOR GENERATING DATABASE QUERIES CONTAINING MULTIPLE LEVELS OF AGGREGATION

[75] Inventors: Allen Reiter, Haifa, Israel; Stephen Charles Hecht, Seattle, Wash.; Matthew Bellew, Seattle, Wash.; Stephen Albert Brandli, Bothell, Wash.; Adam Bosworth, Mercer Island, Wash.

[73] Assignee: Microsoft Corporation, Redmond, Wash.

[21] Appl. No.: 116,826

[22] Filed: Sep. 2, 1993

[51] Int. Cl.$^6$ ............................................. G06F 17/30
[52] U.S. Cl. ..................... 395/613; 395/346; 395/353; 395/356; 395/604; 395/764; 395/769
[58] Field of Search ................................. 395/600, 700, 395/160, 613, 346, 353, 356; 364/419.19

[56] References Cited

U.S. PATENT DOCUMENTS

| | | | |
|---|---|---|---|
| 5,191,522 | 3/1993 | Bosco et al. | 364/401 |
| 5,255,356 | 10/1993 | Michelman et al. | 395/148 |
| 5,293,615 | 3/1994 | Amada | 395/600 |
| 5,317,686 | 5/1994 | Salas et al. | 395/157 |
| 5,418,950 | 5/1995 | Li et al. | 395/600 |
| 5,428,737 | 6/1995 | Li et al. | 395/161 |
| 5,428,776 | 6/1995 | Rothfield | 395/600 |

OTHER PUBLICATIONS

*Microsoft Works User's Guide*, pp. 433–483, 1988.
Microsoft Corporation, "Language Reference," in *Microsoft SQL Server. The Sybase Database Server for PC Networks*, 1990, pp. 32 and 36.
Microsoft Corporation, "Learning TRANSACT–SQL," in *Microsoft SQL Server. The SYBASE Database Server for PC Networks*, 1990, pp. 90–94.

*Primary Examiner*—Thomas G. Black
*Assistant Examiner*—Hosain T. Alam
*Attorney, Agent, or Firm*—Seed and Berry LLP

[57] ABSTRACT

A method and system for displaying results of multiple level aggregation queries and providing hierarchical table sets in response to multiple level aggregation queries. In a preferred embodiment, a database engine program receives multiple-level aggregation queries from a database front-end program. A multiple level aggregation query defines two or more data aggregation levels. In response to a multiple-level aggregation query, the engine creates a hierarchical table set, which contains a separate table for each level of aggregation specified by the multiple-level aggregation query. Each table in the hierarchical table set contains the aggregation information for one level of the multiple-level aggregation query. In a preferred embodiment, the front-end uses the tables in the hierarchical table set to generate a hierarchical window display that the user can view. The engine preferably also generates a crosstab table having row and column headers which are derived from the data in the source tables by converting a crosstab query into a multi-level aggregation query, executing the multi-level aggregation query, and then retrieve the data for the crosstab table using the hierarchical table set.

11 Claims, 18 Drawing Sheets

|     | Order ID (251) | Category Name (252) | Product Name (253) | Order Amount (254) |
|-----|---------|---------------|-------------------------|-------------|
| 201- | 10001 | Seafood | Boston Crab Meat | $1,316.95 |
|     | 10006 | Seafood | Konbu | $87.20 |
|     | 10011 | Confections | Teatime Chocolate Biscuits | $589.05 |
|     | 10012 | Confections | Teatime Chocolate Biscuits | $1,057.60 |
| 205- | 10012 | Beverages | Steeleye Stout | $1,057.60 |
|     | 10012 | Seafood | Boston Crab Meat | $1,057.60 |
|     | 10017 | Seafood | Spegesild | $1,148.00 |
|     | 10020 | Confections | Pavlova | $448.00 |
|     | 10025 | Confections | Pavlova | $185.80 |
| 210- | 10029 | Confections | Pavlova | $97.30 |
|     | 10032 | Seafood | Konbu | $94.88 |
|     | 10035 | Beverages | Sasquatch Ale | $1,984.83 |
|     | 10037 | Beverages | Chang | $438.43 |
|     | 10042 | Seafood | Konbu | $1,061.25 |
| 215- | 10046 | Beverages | Chang | $216.00 |
|     | 10047 | Confections | Teatime Chocolate Biscuits | $219.80 |
|     | 10050 | Confections | Pavlova | $782.50 |
|     | 10051 | Seafood | Konbu | $1,282.00 |
|     | 10052 | Confections | Pavlova | $2,288.80 |
| 220- | 10059 | Confections | Teatime Chocolate Biscuits | $247.20 |
|     | 10060 | Confections | Pavlova | $926.60 |
|     | 10065 | Confections | Teatime Chocolate Biscuits | $783.75 |
|     | 10068 | Beverages | Chang | $312.55 |
|     | 10068 | Beverages | Sasquatch Ale | $312.55 |
| 225- | 10069 | Seafood | Spegesild | $260.40 |
|     | 10072 | Confections | Pavlova | $1,964.70 |
|     | 10076 | Seafood | Boston Crab Meat | $89.60 |
|     | 10080 | Beverages | Chang | $2,313.60 |
|     | 10083 | Beverages | Chang | $881.50 |
| 230- | 10083 | Confections | Pavlova | $881.50 |
|     | 10083 | Confections | Teatime Chocolate Biscuits | $881.50 |
|     | 10084 | Beverages | Chang | $853.00 |
|     | 10087 | Beverages | Sasquatch Ale | $996.10 |
|     | 10088 | Seafood | Konbu | $127.36 |
| 235- | 10088 | Beverages | Sasquatch Ale | $127.36 |
|     | 10090 | Confections | Pavlova | $803.00 |
|     | 10092 | Beverages | Sasquatch Ale | $456.30 |
|     | 10092 | Confections | Teatime Chocolate Biscuits | $456.30 |
|     | 10094 | Seafood | Konbu | $2,619.80 |
| 240- | 10094 | Confections | Teatime Chocolate Biscuits | $2,619.80 |
|     | 10095 | Beverages | Steeleye Stout | $530.00 |
|     | 10096 | Beverages | Chang | $4,960.00 |
|     | 10099 | Beverages | Steeleye Stout | $928.80 |
|     | 10102 | Seafood | Konbu | $1,500.00 |
| 245- | 10104 | Beverages | Chang | $1,143.45 |
|     | 10104 | Seafood | Konbu | $1,143.45 |
|     | 10107 | Beverages | Sasquatch Ale | $916.00 |
|     | 10112 | Beverages | Steeleye Stout | $252.00 |
|     | 10113 | Beverages | Steeleye Stout | $1,124.60 |
| 250- | 10126 | Seafood | Spegesild | $933.50 |

*FIG. 2*

| Category Name | SumOfOrder Amount |
|---|---|
| Beverages | $19,804.67 |
| Confections | $15,233.20 |
| Seafood | $12,721.99 |

FIG. 8

|  | Category Name (1051) | Product Name (1052) | Order ID (1053) | Order Amount (1054) |
|---|---|---|---|---|
| 1001 | Beverages | Chang | 10037 | $438.43 |
|  | Beverages | Chang | 10046 | $216.00 |
|  | Beverages | Chang | 10068 | $312.55 |
|  | Beverages | Chang | 10080 | $2,313.60 |
| 1005 | Beverages | Chang | 10083 | $881.50 |
|  | Beverages | Chang | 10084 | $853.00 |
|  | Beverages | Chang | 10096 | $4,960.00 |
|  | Beverages | Chang | 10104 | $1,143.45 |
|  | Beverages | Sasquatch Ale | 10035 | $1,984.83 |
| 1010 | Beverages | Sasquatch Ale | 10068 | $312.55 |
|  | Beverages | Sasquatch Ale | 10087 | $996.10 |
|  | Beverages | Sasquatch Ale | 10088 | $127.36 |
|  | Beverages | Sasquatch Ale | 10092 | $456.30 |
|  | Beverages | Sasquatch Ale | 10107 | $916.00 |
| 1015 | Beverages | Steeleye Stout | 10012 | $1,057.60 |
|  | Beverages | Steeleye Stout | 10095 | $530.00 |
|  | Beverages | Steeleye Stout | 10099 | $928.80 |
|  | Beverages | Steeleye Stout | 10112 | $252.00 |
|  | Beverages | Steeleye Stout | 10113 | $1,124.60 |
| 1020 | Confections | Pavlova | 10020 | $448.00 |
|  | Confections | Pavlova | 10025 | $185.80 |
|  | Confections | Pavlova | 10029 | $97.30 |
|  | Confections | Pavlova | 10050 | $782.50 |
|  | Confections | Pavlova | 10052 | $2,288.80 |
| 1025 | Confections | Pavlova | 10060 | $926.60 |
|  | Confections | Pavlova | 10072 | $1,964.70 |
|  | Confections | Pavlova | 10083 | $881.50 |
|  | Confections | Pavlova | 10090 | $803.00 |
|  | Confections | Teatime Chocolate Biscuits | 10011 | $589.05 |
| 1030 | Confections | Teatime Chocolate Biscuits | 10012 | $1,057.60 |
|  | Confections | Teatime Chocolate Biscuits | 10047 | $219.80 |
|  | Confections | Teatime Chocolate Biscuits | 10059 | $247.20 |
|  | Confections | Teatime Chocolate Biscuits | 10065 | $783.75 |
|  | Confections | Teatime Chocolate Biscuits | 10083 | $881.50 |
| 1035 | Confections | Teatime Chocolate Biscuits | 10092 | $456.30 |
|  | Confections | Teatime Chocolate Biscuits | 10094 | $2,619.80 |
|  | Seafood | Boston Crab Meat | 10001 | $1,316.95 |
|  | Seafood | Boston Crab Meat | 10012 | $1,057.60 |
|  | Seafood | Boston Crab Meat | 10076 | $89.60 |
| 1040 | Seafood | Konbu | 10006 | $87.20 |
|  | Seafood | Konbu | 10032 | $94.88 |
|  | Seafood | Konbu | 10042 | $1,061.25 |
|  | Seafood | Konbu | 10051 | $1,282.00 |
|  | Seafood | Konbu | 10088 | $127.36 |
| 1045 | Seafood | Konbu | 10094 | $2,619.80 |
|  | Seafood | Konbu | 10102 | $1,500.00 |
|  | Seafood | Konbu | 10104 | $1,143.45 |
|  | Seafood | Spegesild | 10017 | $1,148.00 |
|  | Seafood | Spegesild | 10069 | $260.40 |
| 1050 | Seafood | Spegesild | 10126 | $933.50 |

*FIG. 10*

|   | 1311 Last Name | 1312 Qtr 1 | 1313 Qtr 2 | 1314 Qtr 3 | 1315 Qtr 4 |
|---|---|---|---|---|---|
| 1301 | Buchanan | $2,520.40 | $14,013.08 | $13,191.74 | $13,790.26 |
| 1302 | Callahan | $12,899.85 | $10,213.20 | $18,569.28 | $19,029.04 |
| 1303 | Davolio | $11,321.53 | $32,801.69 | $22,262.92 | $27,545.73 |
| 1304 | Dodsworth | $2,069.98 | $3,646.10 | $10,600.15 | $14,380.68 |
| 1305 | Fuller | $17,547.55 | $19,220.52 | $21,133.45 | $30,221.35 |
| 1306 | King | $15,154.27 | $10,738.63 | $20,598.45 | $9,372.50 |
| 1307 | Leverling | $30,892.27 | $24,731.36 | $17,014.46 | $52,939.76 |
| 1308 | Peacock | $30,828.07 | $16,529.03 | $35,511.67 | $42,173.69 |
| 1309 | Suyama | $12,112.94 | $5,513.51 | $10,366.06 | $15,727.10 |

*FIG. 13*

| Order ID | Last Name | Quarter | Order Amount |
|---|---|---|---|
| 10730 | Buchanan | Qtr 4 | $484.26 |
| 10823 | Buchanan | Qtr 4 | $2,826.00 |
| 10851 | Buchanan | Qtr 4 | $2,603.00 |
| 10675 | Buchanan | Qtr 3 | $1,423.00 |
| 10866 | Buchanan | Qtr 4 | $1,096.20 |
| 10841 | Buchanan | Qtr 4 | $4,581.00 |
| 10812 | Buchanan | Qtr 4 | $1,692.80 |
| 10714 | Buchanan | Qtr 3 | $2,205.75 |
| 10607 | Buchanan | Qtr 2 | $6,475.40 |
| 10761 | Buchanan | Qtr 4 | $507.00 |
| 10654 | Buchanan | Qtr 3 | $601.83 |
| 10648 | Buchanan | Qtr 3 | $372.38 |
| 10711 | Buchanan | Qtr 3 | $4,451.70 |
| 10569 | Buchanan | Qtr 2 | $890.00 |
| 10529 | Buchanan | Qtr 2 | $946.00 |
| 10477 | Buchanan | Qtr 1 | $558.00 |
| 10650 | Buchanan | Qtr 3 | $1,779.20 |
| 10549 | Buchanan | Qtr 2 | $3,554.28 |
| 10575 | Buchanan | Qtr 2 | $2,147.40 |
| 10474 | Buchanan | Qtr 1 | $1,249.10 |
| 10463 | Buchanan | Qtr 1 | $713.30 |
| 10649 | Buchanan | Qtr 3 | $1,434.00 |
| 10721 | Buchanan | Qtr 3 | $923.88 |
| 10845 | Callahan | Qtr 4 | $3,812.70 |
| 10452 | Callahan | Qtr 1 | $2,018.50 |
| 10603 | Callahan | Qtr 2 | $1,483.00 |
| 10450 | Callahan | Qtr 1 | $425.12 |
| 10844 | Callahan | Qtr 4 | $735.00 |
| 10560 | Callahan | Qtr 2 | $1,072.43 |
| 10596 | Callahan | Qtr 2 | $1,180.88 |
| 10460 | Callahan | Qtr 1 | $176.10 |
| 10852 | Callahan | Qtr 4 | $2,984.00 |
| 10857 | Callahan | Qtr 4 | $2,048.21 |
| 10602 | Callahan | Qtr 2 | $48.75 |
| 10455 | Callahan | Qtr 1 | $2,684.00 |
| 10437 | Callahan | Qtr 1 | $393.00 |
| 10632 | Callahan | Qtr 3 | $589.00 |
| 10811 | Callahan | Qtr 4 | $852.00 |
| 10722 | Callahan | Qtr 3 | $1,570.00 |
| 10795 | Callahan | Qtr 4 | $2,158.00 |
| 10476 | Callahan | Qtr 1 | $180.48 |
| 10472 | Callahan | Qtr 1 | $1,036.80 |
| 10614 | Callahan | Qtr 2 | $464.00 |
| 10696 | Callahan | Qtr 3 | $996.00 |
| 10824 | Callahan | Qtr 4 | $250.80 |
| 10589 | Callahan | Qtr 2 | $72.00 |
| 10467 | Callahan | Qtr 1 | $235.20 |
| 10694 | Callahan | Qtr 3 | $4,825.00 |
| 10610 | Callahan | Qtr 2 | $299.25 |
| 10862 | Callahan | Qtr 4 | $581.00 |
| 10627 | Callahan | Qtr 3 | $1,185.75 |
| 10631 | Callahan | Qtr 3 | $55.80 |
| 10545 | Callahan | Qtr 2 | $210.00 |
| 10456 | Callahan | Qtr 1 | $557.60 |
| 10491 | Callahan | Qtr 1 | $259.51 |
| 10660 | Callahan | Qtr 3 | $1,701.00 |
| 10786 | Callahan | Qtr 4 | $1,531.08 |
| 10770 | Callahan | Qtr 4 | $236.25 |
| 10488 | Callahan | Qtr 1 | $1,512.00 |
| 10534 | Callahan | Qtr 2 | $465.70 |
| 10724 | Callahan | Qtr 3 | $638.50 |
| 10521 | Callahan | Qtr 1 | $225.50 |

*FIG. 14*

METHOD AND SYSTEM FOR GENERATING DATABASE QUERIES CONTAINING MULTIPLE LEVELS OF AGGREGATION

TECHNICAL FIELD

The invention relates generally to a method and system for providing a new type of database query, and, more specifically, to a method and system for generating database queries containing multiple levels of aggregation.

BACKGROUND OF THE INVENTION

A database system is a set of computer programs used by a user to store and retrieve data. Such data is often limited to text (letters, numerals, symbols, and other characters), but may include any data that may be stored by a computer. Most database systems store data in tables. A table is a series of rows, also called records. Each row contains data about a particular thing, such as a merchandise order. The rows are divided into columns. The intersection of a row and column is referred to as a field. Each column specifies a particular type of data that is contained in each field of the column. Each field contains the data of the particular type for the intersecting row and column. Example columns for a merchandise orders table include order identifier, salesperson name, quarter of the year in which the order was placed, and the dollar amount of the order, each in a separate field.

Some columns, called calculated columns, do not actually contain any data. Rather, they contain the result of a calculation based upon the data in other columns. An example of a calculated column is an additional column in the merchandise order table called commission. The commission column is defined to be the order amount column multiplied by a constant commission rate. This means that a given field in the commission column contains the contents of the order amount field in the same row multiplied by a constant commission rate. In most database systems, if a user changed the contents of an order amount field, the database system would automatically change the contents of the commission field in the same row to reflect the user's change.

Similarly, some rows, called aggregate rows, also do not actually contain data. Rather, aggregate rows contain the results of a calculation based on the data in other rows. An example of an aggregate row is a row added to the merchandise orders table that contains the sum of the order amounts for all of the other rows in the table. The inclusion of an aggregate row in a table makes the rows of the table more difficult for the database system to manage. This is because, while some columns, like order amount, are well suited to be aggregated into a single field, many kinds of columns are poorly suited to being aggregated into a single field. For example, there is no useful way to aggregate the salesperson name column, because there is no useful way to aggregate the names of several people. As a result, an aggregate row often does not contain fields for certain columns. This destroys the former homogeneity of the rows. Further, to be useful, aggregate information must be available in a predictable position. If aggregated row information is contained in a row of the table, that row is subject to being sorted into different positions making its position unpredictable.

Most database systems are divided into two components: A database engine (engine) for storing, manipulating, and retrieving data; and a database front-end (front-end) for providing an interface to the user, sending commands to the engine, and interpreting the engine's responses to commands. The front-end communicates with the engine by sending the engine commands. The front-end sends the engine commands by calling application programming interface functions (APIs) that are supported by the engine. The engine communicates with a front-end by returning information to the front-end at the conclusion of an API call. Typical APIs supported by engines include those for defining a table, adding a record, moving within the table to a different record, retrieving a record, changing a record, and deleting a record.

Most engines also support APIs for submitting queries. A query is a set of instructions to combine, filter, and sort the contents of one or more tables. Queries are usually expressed in one of several common query languages, such as Structured Query Language (SQL). SQL permits the specification of a query with a single level of aggregation. Such a query specifies grouping columns. For every unique combination of fields in the grouping column of a source table, a single row is created in the query table. any non-grouping columns that appear in the source table can only appear in the query table in an aggregated form. For each such field, an aggregating function is designated. The aggregating function is used to produce a value for each field in the aggregated column. For each field, the aggregating function performs some operation on the values of all of the fields in that column from the rows of the source table corresponding to a given row of the query table. Because only one set of grouping fields can be designated, aggregates can only be produced at one level-the level at which the combination of grouping column fields is unique.

Some engines can produce a-sort of multiple level aggregation query table in which aggregate rows of various levels are interspersed between rows of source table data. This type of query is difficult for a front-end to interpret. As a result, most front-ends that submit and retrieve the results of this type of query simply print the results row by row as a report.

SUMMARY OF THE INVENTION

An object of the invention is to provide a method and system for processing database queries.

An object of the invention is provide a method and system for generating multiple-level aggregation query results.

A further object is to provide a means for displaying the results of a multiple level aggregation query.

A still further object of the invention is to provide a method and system for generating crosstab query results and for displaying the crosstab query results.

A still further object of the invention is to provide an improved database engine and application programming interface for multiple-level aggregation queries.

A still further object of the invention is to provide an improved database engine and application programming interface for crosstab queries.

These and other objects, which will become apparent as the invention is more fully described below, are provided by a method and system for generating a multi-level database query result.

A method and system for providing hierarchical table sets in response to a multiple level aggregation query is provided. In a preferred embodiment a database engine program receives multiple-level aggregation queries from a database front-end program. A multiple-level aggregation query defines two or more data aggregation levels. In response to a multiple-level aggregation query, the engine creates a hierarchical table set which contains a separate table for each level of aggregation specified by the multiple level aggregation query. Each table in the hierarchical table set contains the aggregation information for one level of the multiple-level aggregation query. In a preferred embodiment, the front end uses the tables in the hierarchical table set to generate a hierarchical window display that the user can view. The engine preferably also generates a crosstab table having row and column headers which are derived from the data in the source tables by converting a crosstab query into a multiple-level aggregation query, executing the multiple-level aggregation query and then retrieving the data for the crosstab table using the hierarchical table set.

BRIEF DESCRIPTION OF THE DRAWINGS

FIG. 2 is a table diagram showing the contents of the source table.

FIGS. 7–10 are table diagrams of each of the output tables.

FIG. 13 is a table diagram of a sample crosstab.

FIG. 14 is a portion of the rows of an order table.

DETAILED DESCRIPTION OF THE INVENTION

I. Introduction:

A method and system for providing hierarchical table sets in response to multiple level aggregation queries is provided. In a preferred embodiment, an improved database engine program, hereafter referred to simply as the engine, receives multiple-level aggregation (MLA) queries from a database front-end program (the front-end). A multiple level aggregation query defines two or more data aggregation levels (levels). In response to a multiple-level aggregation query, the engine creates a hierarchical table set (HTS), which contains a separate table for each level of aggregation specified by the multiple-level aggregation query. Each table in the hierarchical table set contains the aggregation information for one level of the multiple-level aggregation query. As an example, a multiple-level aggregation query based on a merchandise order table might specify a level for the order amount for each order ID, a level for the sum of order amounts for each product name, a level for the sum of order amounts for each category name, and the sum of order amounts for all orders. In response to this query, the engine creates a hierarchical table set that contains a table for the level containing the order amount for each order ID, a table for the level containing the sum of order amounts for each product name, a table containing the sum of order amounts for each category name, and a table containing the sum of order amounts for all orders. The front-end can then use the tables in the hierarchical table set to generate a hierarchical window display that the user can view, like the hierarchical window display shown in FIG. 3 (discussed in detail below).

The present invention also provides a method and system for specifying a query that is to have a crosstab query result and for generating the crosstab query result. A crosstab query result is a table that is in a spreadsheet-like format. A crosstab table has row and column headers, which are derived from the data in the source tables. The engine generates a crosstab table by converting a Crosstab query into a multi-level aggregation query, executing the multi-level aggregation query, and then retrieving the data for the crosstab table using the hierarchical table set.

Figure 1:
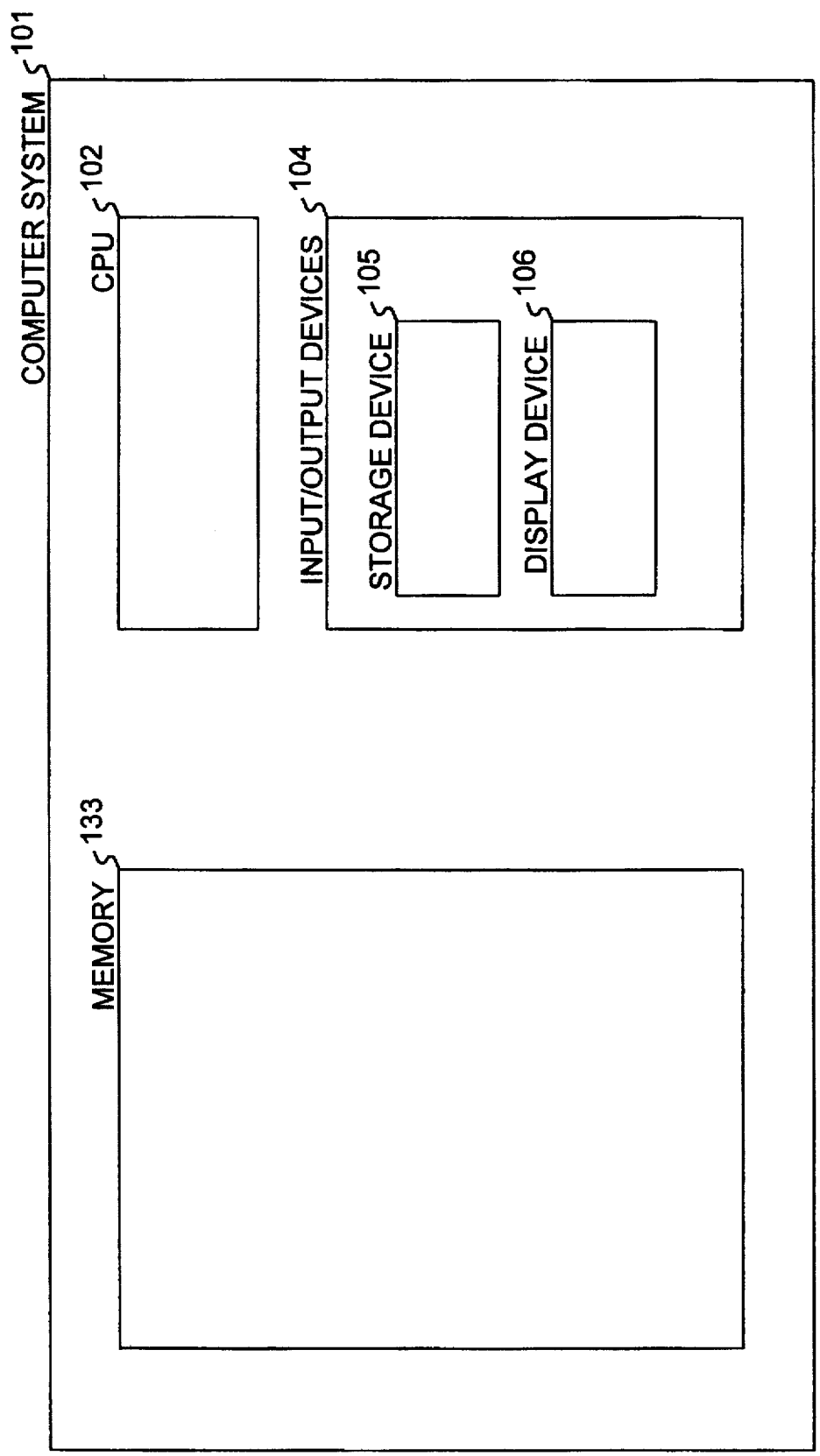
FIG. 1 is a high-level block diagram of a general purpose computer system.

FIG. 1 is a high-level block diagram of the general-purpose computer system upon which the engine preferably operates. The computer system 101 contains a central processing unit (CPU) 102, a computer memory (memory) 103, and input/output devices 104. The APIs that preferably comprise the engine reside in the memory and execute on the CPU, as do the programs that comprise the front-end. Among the input/output devices is a storage device 105, such as a hard disk drive, upon which the engine preferably stores tables. Also among the input/output devices is a display device 106 for presenting visual information to the user.

II. Multiple-Level Aggregation Queries That Yield Hierarchical Table Sets:

The engine produces a hierarchical table set in response to receiving a multiple-level aggregation query. Multiple-level aggregation queries can be specified using an extension to SQL called a multiple group by (MGB) statement. Two or more respectively embedded MGB statements comprise a multiple level aggregation query. An MGB statement is defined as shown in Table 1.

TABLE 1

1. <mgb-statement>::=
2. <query-specification>|
3. <select-specification>LEVEL<level-number>;
4.    <mgb-statement>
5. GROUP BY <grouping-specification-list>LEVEL<level number>

The field <mgb-statement> in line 1 designates the entire MGB statement; the field <query-specification> designates a standard SQL query; the field <select-specification> designates the columns to include in a particular level of the query; the field <level-number> in lines 3 and 5 designates the level of embedding of the MGB statement in the multiple level aggregation query; the field <mgb-statement> in line 4 designates an embedded MGB statement; and the <grouping-specification-list> field designates the grouping column or columns that define the level of the MGB statement by defining the list of columns for which each unique combination of values defines a row.

FIG. 2 is a table diagram showing the contents of a source table used to demonstrate the use of multiple level grouping queries to generate hierarchical table sets. The source table 200 contains rows 201–250, each of which corresponds to a merchandise order. The source table is divided into four columns: an order identifier column 251, a category name column 252, a product name column 253, and an order amount column 254. One effective way to view the data stored in this table is to show the order amount for each order ID, the sum of order amounts for each product name, the sum of order amounts for each category name, and the sum of order amounts for all orders. An SQL query using the MGB statement described above to specify such a query Would appear as shown in Table 2:

TABLE 2

1. SELECT sum([Order Amount]) LEVEL 3;
2.   SELECT [Category Name], sum([Order Amount]) LEVEL 2;
3.     SELECT [Product Name], sum([Order Amount]) LEVEL 1;
4.       SELECT [Order ID], [Order Amount]
5.       FROM Orders;
6.     GROUP BY [Product Name] LEVEL 1
7.   GROUP BY [Category Name] LEVEL 2

Lines 4 and 5 of the query define level 0. Level 0 contains the order ID and the order amount for each order ID. Lines 3 and 6 define level 1 of the query. Level 1 of the query contains the sum of order amounts for each product name. Lines 2 and 7 of the query define level 2 of the query. Level 2 of the query contains the product category sum of order amounts for each category name. Line 1 of the query defines level 3 of the query. Level 3 of the query coutains a sum of order amounts for all of the rows in the source table.

The front-end uses APIs to submit the query to the engine, then retrieve the query results. The front-end then preferably displays an optimized view of the query results on the display device.

Figure 3:
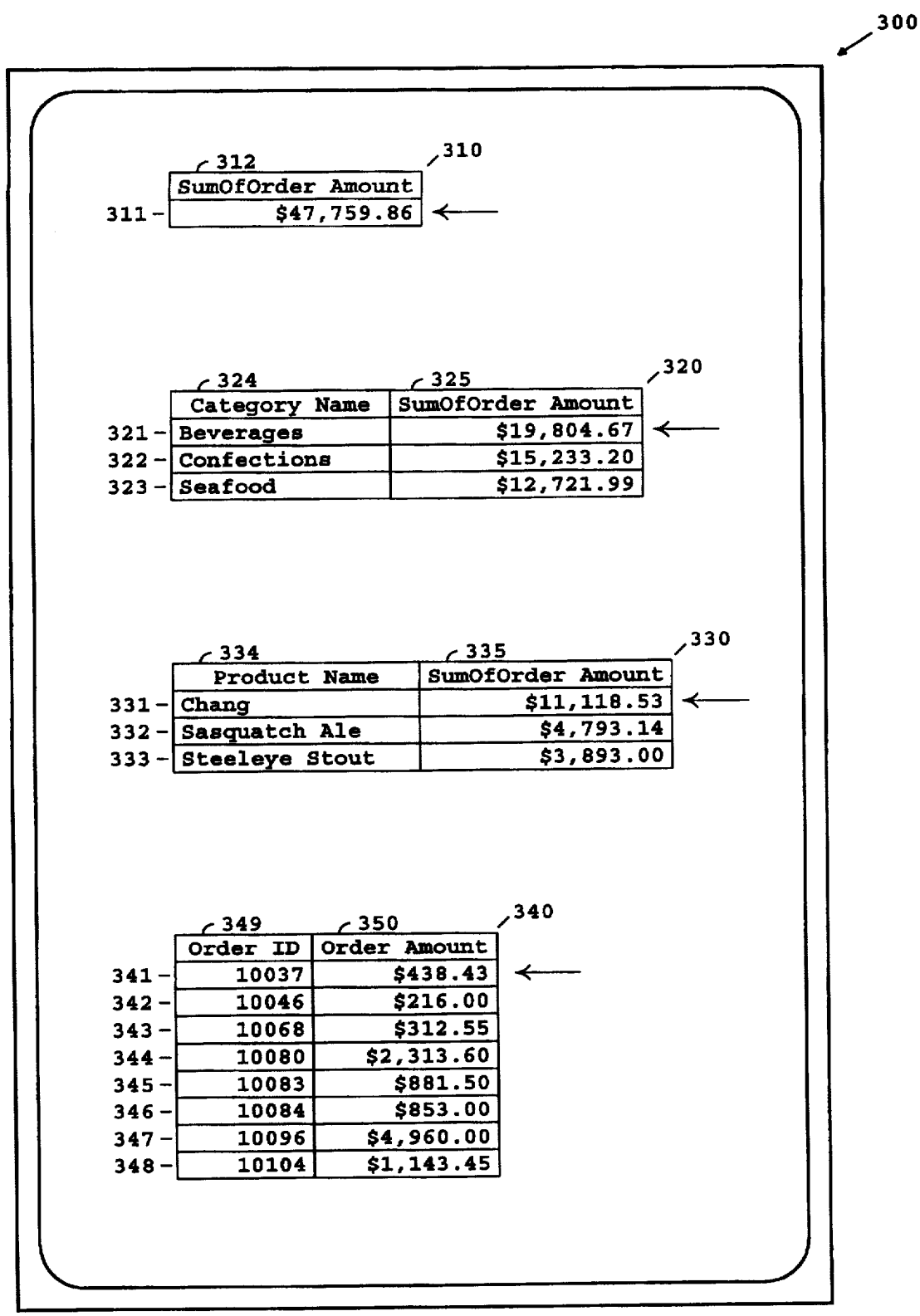
FIG. 3 is a display image showing the display of hierarchical display windows.

Each level of the query specifies at least one grouping column and an aggregated column. For each level, the engine creates an output table having the grouping column and the aggregated column for that level. The engine adds a row to the output table for a level for each unique contribution value grouping column contents. The added row contains the unique value from the grouping column(s) and an aggregation of all of the rows of the source table that contain the grouping field contents of the output table row. The engine returns these tables, as a hierarchical table set, to the front-end. The front-end uses the hierarchical table set to display hierarchical display windows. Each hierarchical display window contains part of the data in one of the tables of the hierarchical table set. FIG. 3 is a display image showing the display of hierarchical display windows corresponding to the query shown in Table 2. The display device 300 contains four windows: a level 3 window 310, a level 2 window 320, a level 1 window 330 and a level 0 window 340. The level 3 window has one row 311 and one aggregated column, the sum of order amount column 312. The level 2 window table has 3 rows 321–323. The level 2 also has a grouping column category name 324, as well as an aggregated column sum of order mount 325. The level 1 window has 3 rows 331–333. The level 1 window also has a grouping column product name 334 and an aggregated column sum of order amount 335. The level 0 window has 8 rows, 341–348. The level 0 window also has 2 raw data columns: an order ID column 349 and an order amount column 350. The current row of each window is highlighted. For instance, in the level 2 window, row 321 is highlighted as indicated by the arrow.

Each window of the hierarchical window display shows the rows that are aggregated in the selected (highlighted) row of the next higher level window. For example, highlighted row 311 is an aggregation of rows 321–323 of the level 2 window. Similarly, highlighted row 321 of the level 2 window is an aggregate of rows 331–333 of the level 1 window. Also, highlighted row 331 of the level 1 window is an aggregate of highlighted rows 341–348 of the level 0 window.

Figure 4:
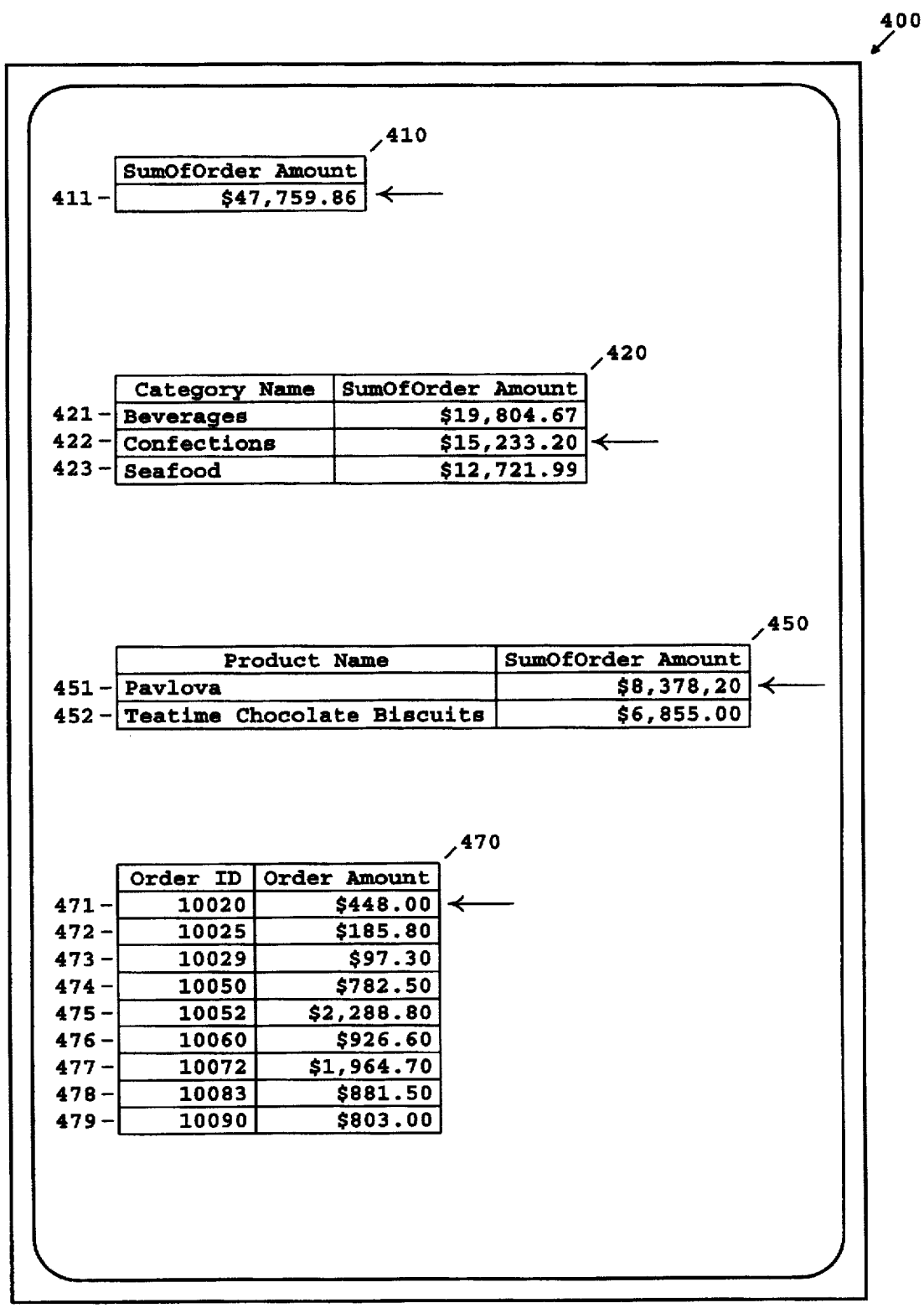
FIG. 4 is a screen image showing the hierarchical display of FIG. 3.

When the front-end displays the tables of a hierarchical table set in a hierarchical table display, the user may change the current (highlighted) row of any window to examine different aspects of the aggregated and raw data. For example, FIG. 4 is a screen image showing the hierarchical window display shown in FIG. 3 after the user has changed the current row of the level 2 window. Here the user has changed the current row of the level 2 window from the 421 row to the 422 row in order to examine the data for the Confections category is based. As can be seen by comparing FIGS. 4 and 3, the level 3 window is unchanged. The contents of the level 2 window have not changed, but the new current row of the level 2 window row 422 has been highlighted, while the former current row of the level 2 window row 421 has been unhighlighted. While the columns of the level 1 table have not changed, the rows of the level 1 window have changed. The level 1 window 450 now contains rows 451 and 452 which contain the information that is aggregated in the current row of the level 2 window, row 422. Similarly, while the columns of the level 0 window have not changed, the level 0 window 470 now contains rows 471–479. These rows contain the data that is aggregated in the current row of the level 1 window, row 451.

Figure 5:
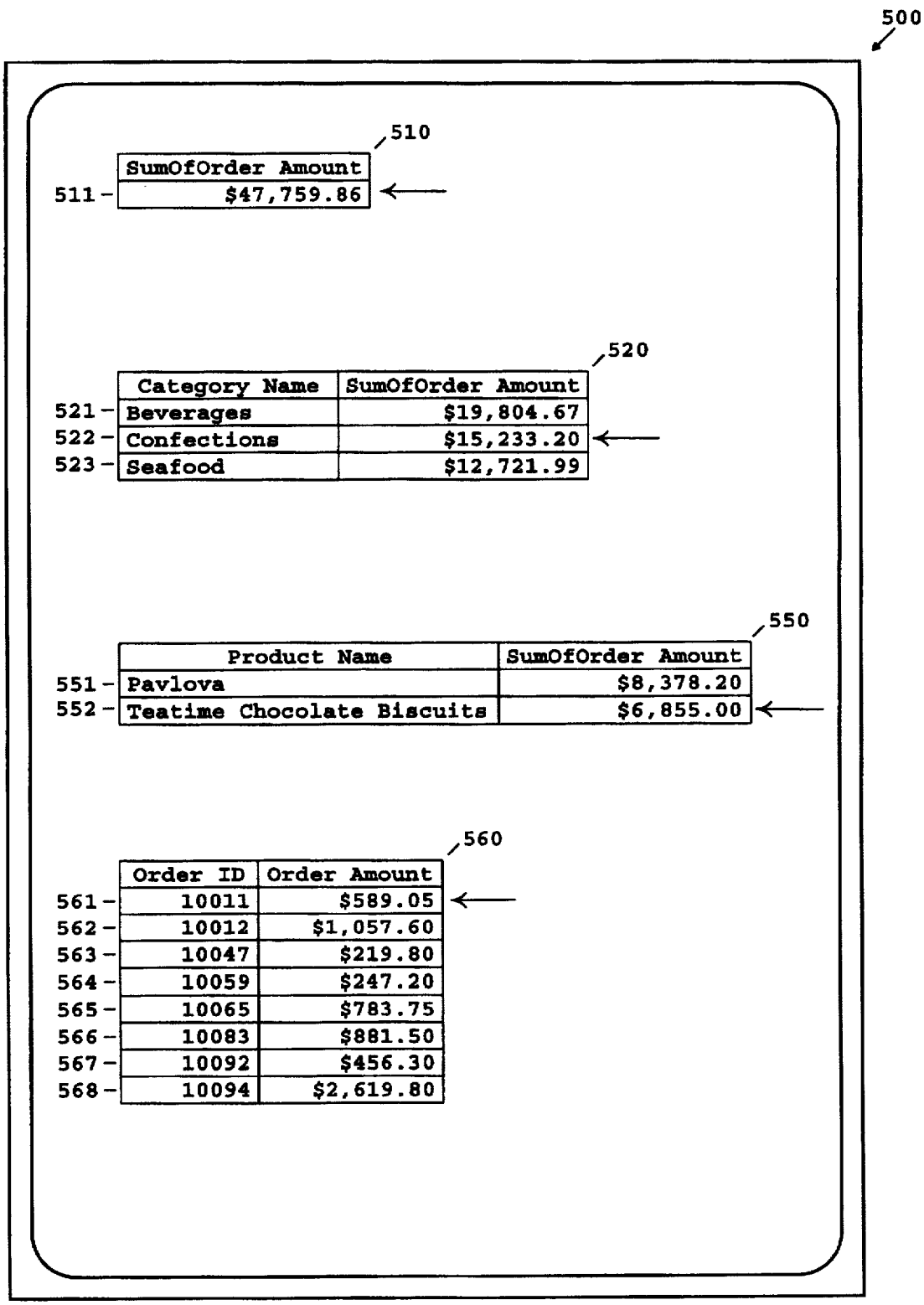
FIG. 5 is a screen image of the hierarchical window display of FIG. 4.

The user of the front-end can change the current row of any displayed window to see the data at lower levels that is aggregated to form the new current row. FIG. 5 is a screen image of the hierarchical window display of FIG. 4 after the user has changed the current row of the level 1 table.

Here the user has changed the current row of the level 1 window from the row 551 to the row 552. The level 3 and level 2 window have not changed. The contents of the level 1 window have not changed, but the new current row of the level 1 window, row 552, has been highlighted, while the former current row of the level 1 window, row 551, has been unhighlighted. While the columns of the level 0 window have not changed, the rows of the level 0 window have changed. The level 0 window 560 now contains rows 561–568, which contain the information that is aggregated in the current row of the level 1 window, row 552.

Figure 6:
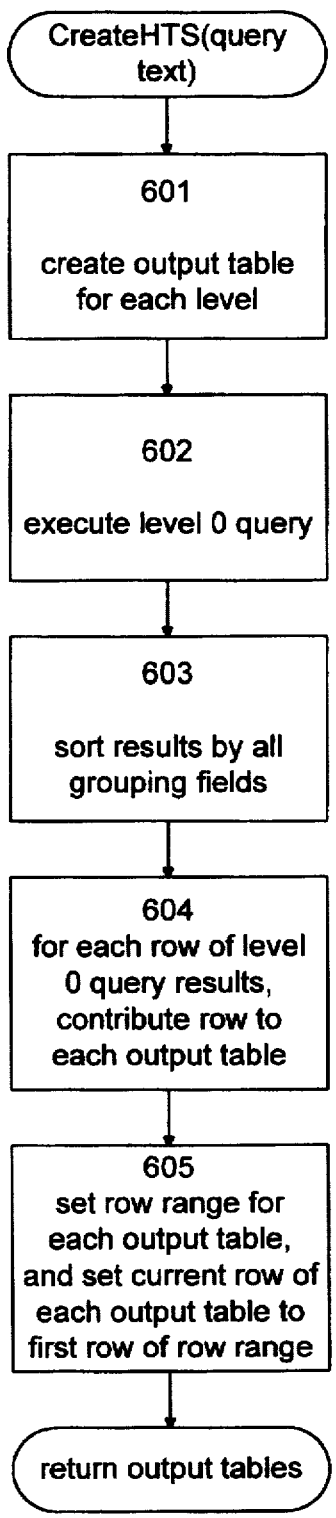
FIG. 6 is a flow diagram of the CreateHTS API.

FIG. 6 is a flow diagram of the CreateHTS API. The front-end calls this API to submit a multiple-level aggregation query to the engine. The query text is a parameter of this API. Within the API, the engine executes the query, producing the hierarchical table set specified by the query and returning it to the front-end. In step 601, the engine determines how many levels are specified by the query, and creates an output table for each level of the query. Each output table contains the aggregated columns specified in the query for its level as well as all of the grouping columns specified for its and all higher levels.

Figure 7:
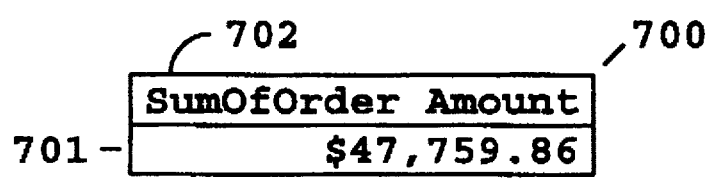
Figure 9:
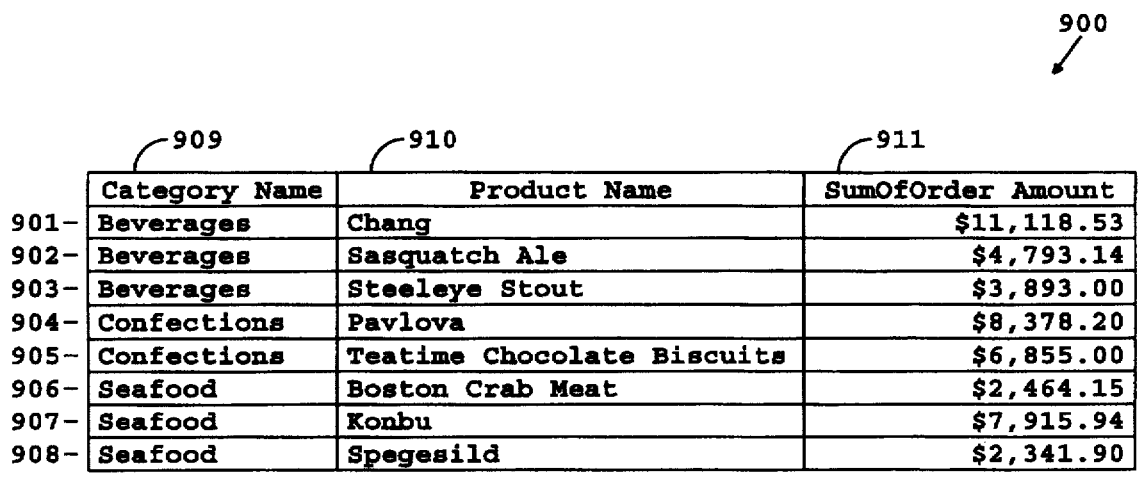

The sample output tables help illustrate step 601. FIG. 7–10 are table diagrams of each of the output tables produced by the engine from the data in the source table shown in FIG. 2 in response to the MGB statement shown in Table 2. FIG. 7 is a table diagram showing the level 3 output table. The level 3 output table 700 has a single row 01, no grouping columns, and a single aggregated column 702. The table has only a single row because it has no grouping columns. The table has no grouping columns because the query does not specify any grouping columns for level 3, and there are no high levels whose grouping columns must be included. FIG. 8 is a table diagram of a level 2 table. The level 2 table 800 has three rows 801–803. The table has one grouping column, a category name grouping column 804. The table has one aggregated column, a sum of order mount column 805. The table has the category name grouping column because this grouping column is specified in level 2 of the query. No higher level has any grouping columns which must be included. FIG. 9 is a table diagram of the level 1 table. The level 1 table 900 has 8 rows 901–908. The table has one grouping column inherited from level 2, the category name column 909. The table also has grouping column product name 910, specified in level 1 of the query. The table has one aggregated column, the sum of order amount column 911. FIG. 10 is a table diagram of the level 0 table. The level 0 table 1000 has 50 rows 1001–1050. These rows correspond one-to-one with the rows in the source table. The table has two grouping colunms: A category name column 1051 specified in level 2 of the query, and a product name column 1052 specified in level 1 of the query. The table also has two unaggregated raw data columns: An order ID column 1053 and an order amount column 1054.

In step 602, the engine executes the level 0 query. The level 0 query is a standard SQL query, and methods for executing standard SQL queries are well-known in the art. In step 603, the engine sorts the results of the level 0 query by all of the grouping fields specified in the query for any level. The grouping fields are used as sort keys in the order of the level for which they are specified.

In step 604, the engine "contributes" each row of the level 0 query results to each output table. Contributing a row of the level 0 query results to an output table involves first seeking a row of the output table whose grouping field or fields match the corresponding field or fields in the query result row. If no such row of the output table is found, one is created. The engine then applies the aggregation function associated with each aggregated column of the output table to update the aggregated fields of the row of the output table to reflect the data in the fields of the query results row referenced by the aggregate. For example, if the order mount field of the query result row was $50.00 and a level 1 aggregate column was the sum of order amounts, then the sum of order amounts field of the level 1 output table row whose grouping fields match the corresponding fields in the query results row would be increased $50.00.

In step 605, the engine sets the accessible range (range) of each output table in descending level order. The range for each table is used by the MoveOnHTS API to determine which rows of an output table are currently accessible. In a particular output table, the engine sets the range by searching for the first and last record of the output table that match the grouping field of the current row of the next higher level output table. Since the rows of each output table are sorted by all of the grouping fields for the entire query, the rows between the first and last matching rows also match the grouping fields of the current row of the next highest level output table. The engine sets the range for the output table to correspond to this series of fields. The range for the highest level table cannot be set in this way because there is no higher level table. Instead, the range of the highest level table is set to include all of the rows of the highest level table. After the range is set for an output table, the current row of that output table is set to the first row of the range. This process then repeats for each lower level table. After step 605, the API returns the output tables to the front-end as a hierarchical table set.

Figure 11:
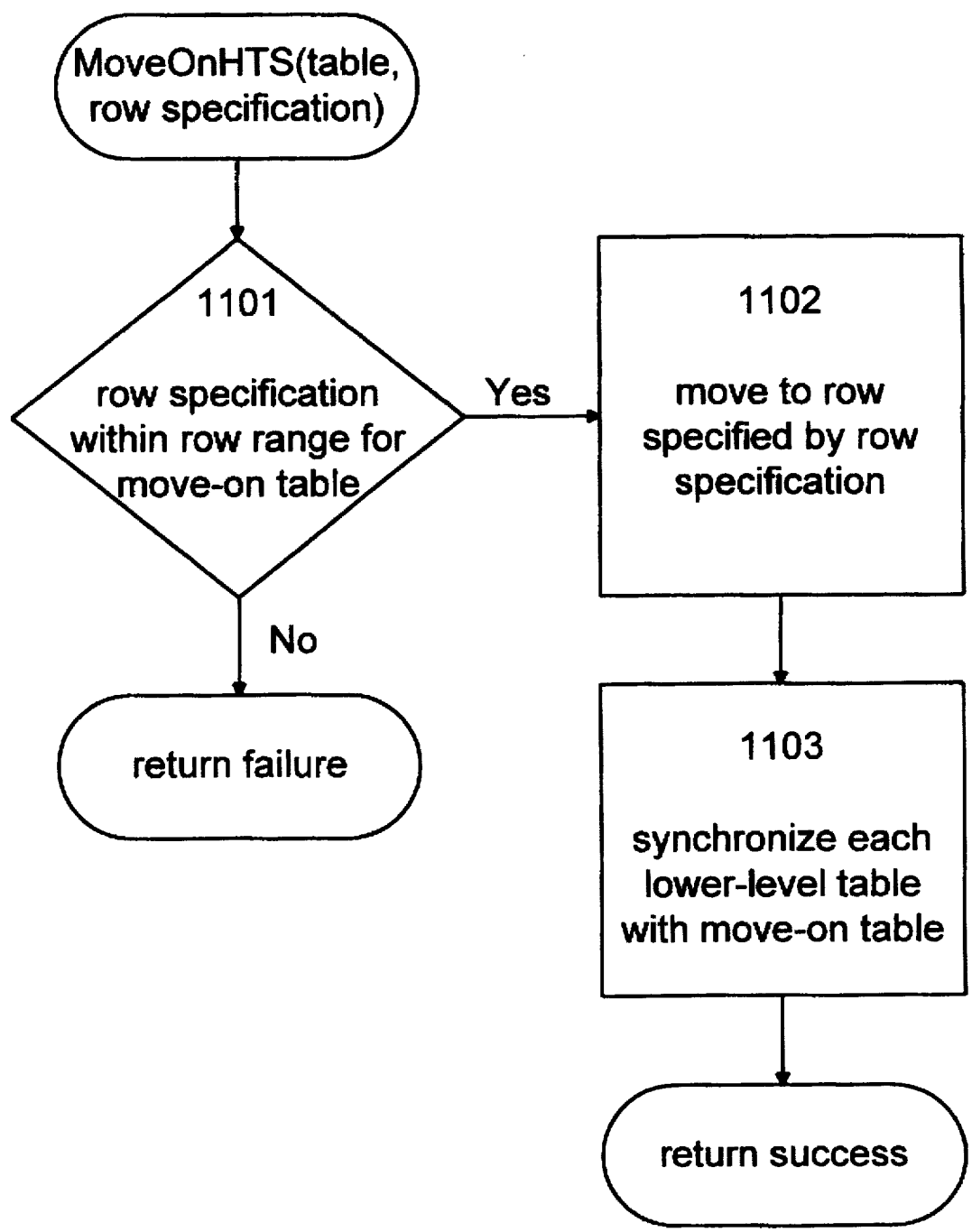
FIG. 11 is a flow diagram of the MoveOnHTS API.

FIG. 11 is a flow diagram of the MoveOnHTS API. The front-end calls this API in order to move to a new row (i.e., change the current row) in one of the output tables of the HTS. Parameters of this API are a table whose current row is to be changed (the move-on table) and the row specification that defines the row of the move-on table to which the engine should move. A row specification can be absolute (e.g., "row 7", "first row", "last row") or relative (e.g., "forward one row", "backward three rows"). The API moves to the row specified by the row specification, if possible, and updates the current row and accessible range of all lower level tables to contain detail on the new current row in the move-on table. In step 1101, if the row specified by the row specification is within the accessible range for the move-on table, then the engine continues at step 1102, else the engine returns failure to the front-end. In step 1102, the engine moves to the row specified by the row specification in the move-on table. In step 1103, the engine synchronizes the lower level tables with the move-on table. In descending level order, the engine updates the range for the table by identifying the first and last row of the table whose grouping fields match those of the current row of the next higher level table. The engine then sets the current row of the table to the first row of the accessible range and repeats the process for the next lower level table. The engine then returns success.

Figure 12:
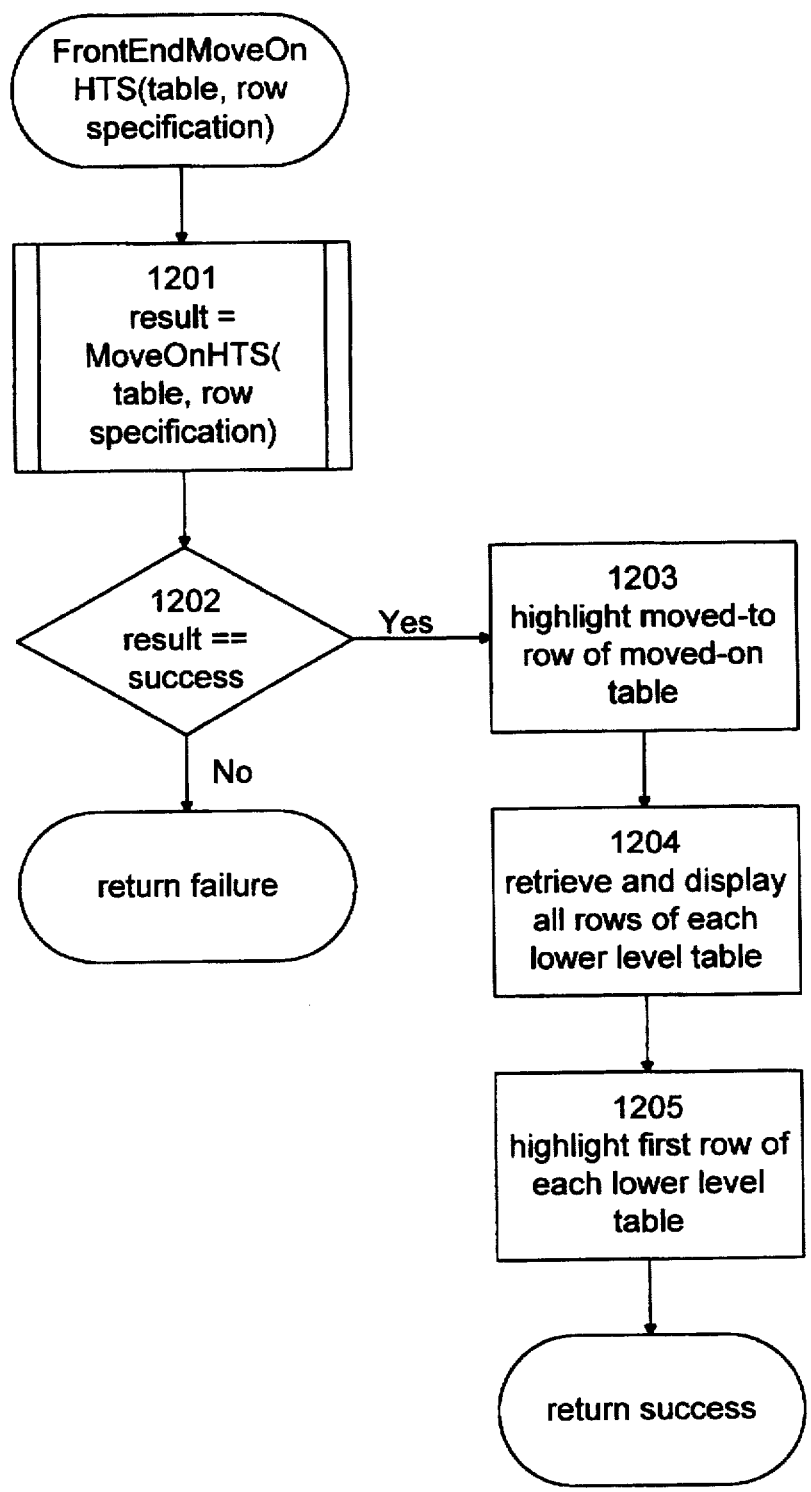
FIG. 12 is a flow diagram of the front and MoveOnHTS function.

FIG. 12 is a flow diagram of the front-end MoveOnHTS function. This function is executed within the front-end in order to move to a new row in one of the output tables of an HTS and update the windows accordingly. Parameters of this function are table whose current row is to be changed (the move-on table) and the row specification that defines the row of the move-on table to which the engine should move. The function calls the MoveOnHTS API to move to the row specified by the row specification, if possible, and refreshes the display to make it current in light of the moved row. In step 1201, the function calls the MoveOnHTS API passing at the move-on table and the row specification. As described in conjunction with FIG. 11, the move on HTS API moves to the row specified by the row specification, if possible, and updates the current row and accessible range of all lower level tables to contain detail on a new current row in the move-on table. The front-end stores the return code returned by the move-on HTS API in a result variable. In step 1202, if the result variable contains a success return code, then the function continues at step 1203, else the function returns a failure return code.

In step 1203, in the window for the level of the move-on table, the front-end highlights the move-to row. At this point, the front-end also unhighlights the former current row move-on. In step 1204, the front-end uses a retrieve API to retrieve all of the rows of each table at a lower level than the move-on table. The front-end then displays the retrieved rows of each lower level table in the window for the tables level. In a preferred embodiment, some or all of the hierarchical display windows are scrollable. That is, at a given time, they display only a portion of the accessible records of the table for their level. The user can then "scroll" the rows to see rows that were not formerly visible. In this embodiment, in step 1204, the front-end retrieves only the rows necessary to fill the window. In step 1205, the front-end highlights the first row of each table at a lower level than the move-on table and returns.

III. Crosstab Queries That Yield Crosstab Tables:

Sometimes it is desirable to view query results in spreadsheet like format called a cross table ("crosstab"). FIG. 13 is a table diagram of a sample crosstab. The crosstab 1300 includes column header 1316 and columns 1312–1315; row header 1311 and rows 1310–1309; and row header name 1317. The intersection of columns and rows are referred to as cells. In this example, the column headers are "Qtr 1," "Qtr 2," "Qtr 3," and "Qtr 4;" the row headers are "Buchanan" through "Suyama;" and the row header name is "Last Name." The cells contain dollar amounts. This example crosstab is generated from the source table of FIG. 14. FIG. 14 is a portion of the rows of an Order table that contains the columns Order ID, Last Name, Quarter, and Order Amount. The crosstab 1300 contains the result of a query that aggregates the order amounts for each person by quarter. That is, the cell at the intersection of the "Qtr 2" for salesman "King" contains "$10,738.63," which is the total amount of the order taken by King for the second quarter.

The present invention provides a method and system for specifying a query that is to have a crosstab query result and for generating the crosstab query result. When specifying a crosstab, an input table is identified to be the source of the data. The input table can be either a source table or a query result. One input column is designated to be aggregated (generally) as the value column for the cells; one input column is designated as the row header; and one input column is designated as the column header. The resulting crosstab table contains a row for each distinct value in the designated row header column and a column for each distinct value in the column header value. Referring again to the example of FIG. 13, the column header column is "Quarter," the row header column is "Last Name," and value column is the "Order Amount."

Table 3 illustrates a preferred syntax for specifying a crosstab query.

TABLE 3

TRANSFORM <value>
   SELECT <row-header-list>
   FROM <input table>
   GROUP BY <row-header>
   PIVOT <column-header> IN <column-list>

The field <value> designates the value column; the field <row-header-list> designates a list of row header columns; the field <input table> designates the input table; the field <row-header> designates the input column for row groupings; the field <column-header> designates the column header column; and the field <column-list> designates specific column header for the crosstab table. Table 4 illustrates a query for the sample of FIG. 13.

TABLE 4

TRANSFORM [Order Amount]
   SELECT [Last Name]
   FROM [Order Table]
   GROUP BY [Last Name]
   PIVOT [Quarter]

If only the results for the second and fourth quarters were needed, then the PIVOT statement would be replaced with the following:

PIVOT [Quarter]IN [Qtr 2][Qtr 4]

In a preferred embodiment, the engine uses hierarchical table sets to generate a crosstab table. The engine receives a crosstab query and converts the crosstab query into a multi-level aggregation query. This multi-level aggregation query is executed to generate hierarchical table sets (HTS). The engine loops through these HTSs to generate the crosstab query results.

Figure 15:
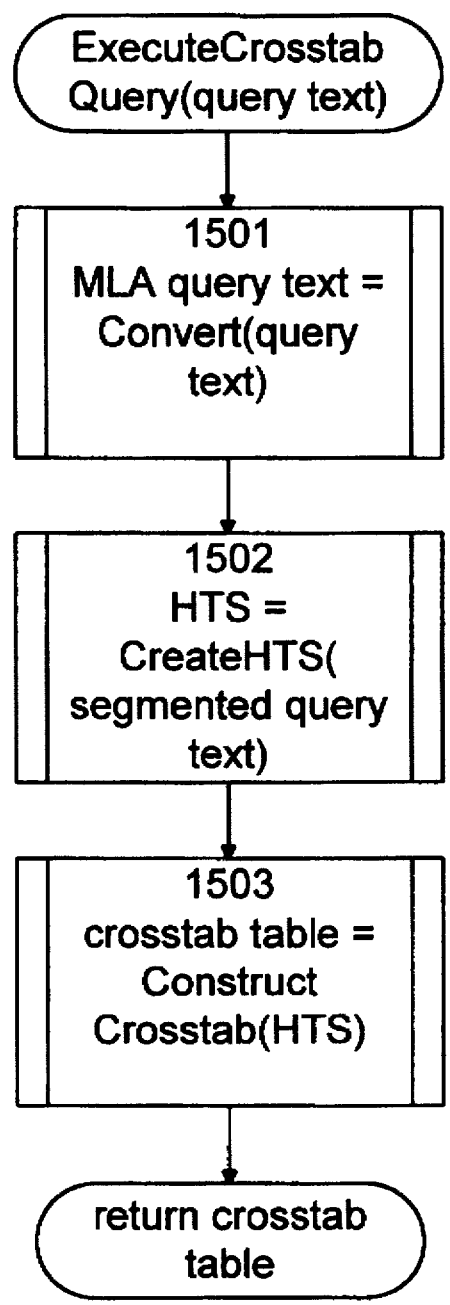
FIG. 15 is a flow diagram of the method for executing a crosstab query.

FIG. 15 is a flow diagram of the method for executing a crosstab query. In step 1501, the engine invokes the method Convert to convert the crosstab query to multi-level aggregation queries. In step 1502, the engine invokes the method CreateHTS to create the HTSs for the crosstab query. In step 1503, the engine invokes the method ConstructCrosstab to generate the crosstab table. The method then returns.

Figure 16:
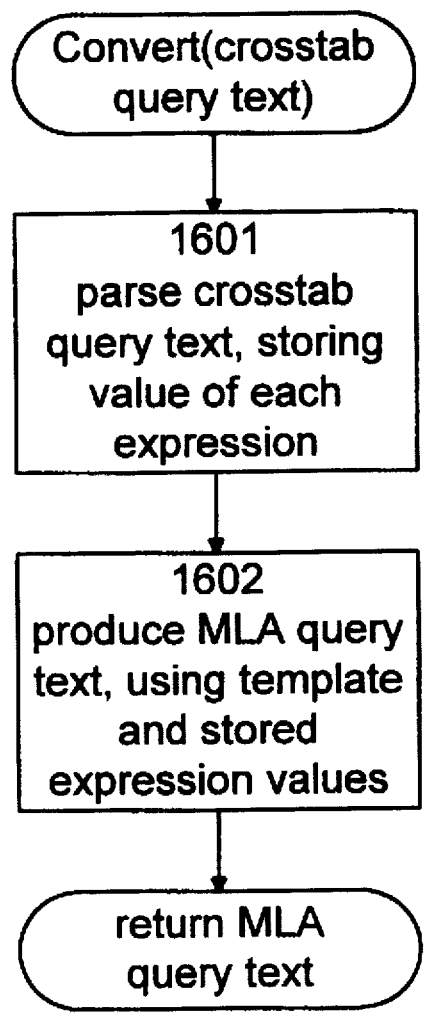
FIG. 16 is a flow diagram of the method Convert.

FIG. 16 is a flow diagram of the method Convert. Table 5 illustrates the general format for converting a crosstab query into the multi-level aggregation query. Each of the fields corresponds to field from Table 3. The WHERE clause is optional depending on whether the field <column-list> is specified in the crosstab query.

TABLE 5

SELECT <row-header-list> Level 1
   SELECT <value>
   FROM <input>
   GROUP BY <colmn-header>
   [WHERE <column-header> IN <column-list>]
GROUP BY <row-headers> Level 1

Table 6 illustrates the multi-level aggregation query for the query of Table 4.

TABLE 6

SELECT [Last Name]> Level 1
   SELECT [Order Amount]
   FROM [Order Table]
   GROUP BY Quarter
GROUP BY [Last Name] Level 1

Referring again to FIG. 16, in step 1601, the engine parses the crosstab query. In step 1601, the engine generates the multi-level aggregation query and returns.

Figure 17:
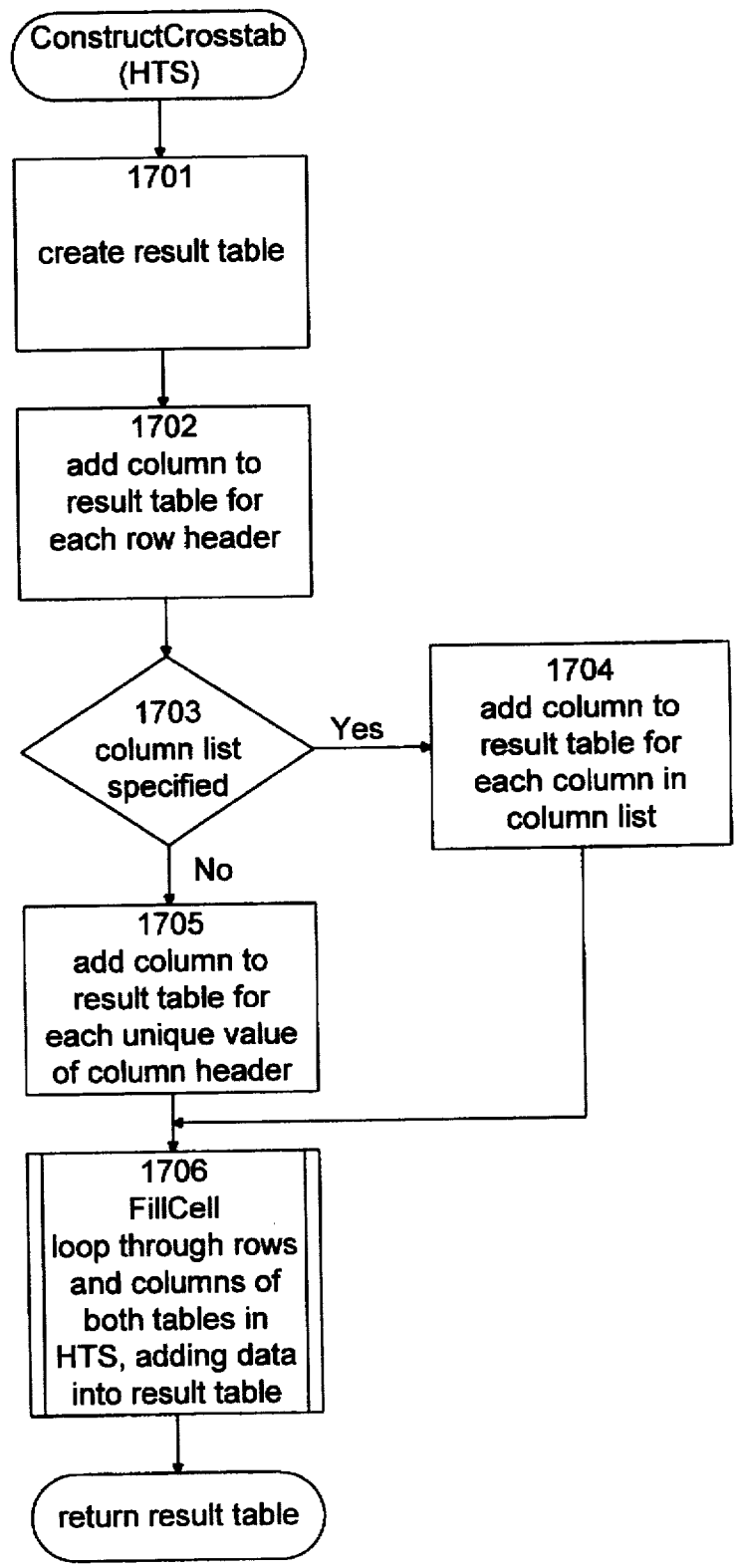
FIG. 17 is a flow diagram of the method ConstructCrosstab.

FIG. 17 is a flow diagram of the method ConstructCrosstab. This method constructs a crosstab table based on the passed hierarchical table sets. In step 1701, the engine allocates a crosstab table. In step 1702, the engine appends a column to the crosstab table for each row header column specified in the field <row-header-list>. In step 1703, if a field <column-list> is specified, then the engine continues at step 1704, else the engine continues at step 1705. In step 1704, the engine appends a column to the crosstab table for each field value listed in the field <column-list>. In step 1705, the engine appends a column to the crosstab table for each unique field value in the column designated by the field <column-header> of the Order table. In step 1706, the engine invokes the FillCells method to fill in the cells of the crosstab table and returns.

Figure 18:
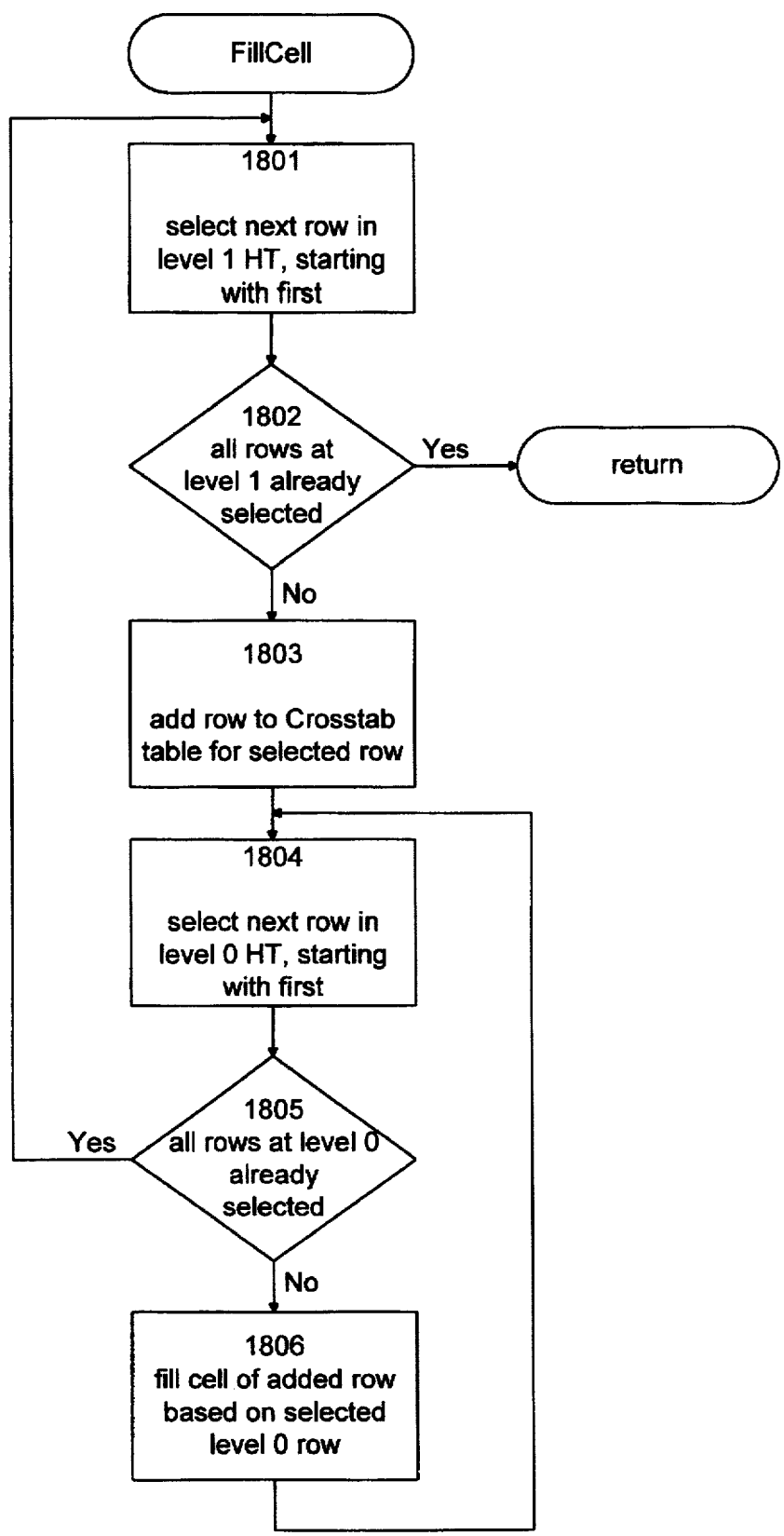
FIG. 18 is a flow diagram of the method FillCell.

FIG. 18 is a flow diagram of the method FillCell. The method loops through the hierarchical table sets to fill in the cells of the crosstab table. In step 1801, the engine selects the next row of the Level 1 cursor, starting with the first row. In step 1802, if all the rows in Level 1 have already been selected, then the engine returns, else the engine continues at step 1803. In step 1803, the engine adds a row to the crosstab table for the selected Level 1 row. In step 1804, the engine selects the next row in the Level 0 cursor, starting with the first row. In step 1805, if all the rows in Level 0 have already been selected, then the engine loops to step 1801 to select the next row in Level 1, else the engine continues at step 1806. In step 1806, the engine fills in the cell of the row added to the crosstab table based on the selected Level 0 row and loops to step 1804 to select the next row at Level 0.

While this invention has been shown and described with reference to preferred embodiments, it will be understood by those skilled in the art that various changes or modifications in form and detail may be made without departing from the scope of the invention.

We claim:

1. A method in a computer system for generating a database query result having an arbitrary number of aggregation levels from a source table comprised of records each having a plurality of grouping fields and an aggregatable value, comprising the steps of:

receiving a query request specifying a plurality of aggregation levels, the aggregation levels being ranked so that every aggregation level is either superior or inferior to every other aggregation level, each aggregation level specifying one of the grouping fields;

for the aggregation level that is superior to all other aggregation levels:

producing a result table in which the aggregatable value is aggregated from all of the records of the source table for each distinct value of the grouping field specified by the aggregation level, and selecting a distinct value of the grouping field specified by the aggregation level;

for each aggregation level that is inferior to at least one other aggregation level:

producing a result table in which the aggregatable value is aggregated, for each distinct value of the grouping field specified by the aggregation level, from all of the records of the source table having the selected value of the grouping field specified by the aggregation level that is superior to the aggregation level and inferior to the largest number of other aggregation levels, and selecting a distinct value of the grouping field specified by the aggregation level that occurs in a record of the source table having the selected value of the grouping field specified by the aggregation level that is superior to the aggregation level and inferior to the largest number of other aggregation levels;

selecting a different distinct value of the grouping field specified by one of the aggregation levels; and for each aggregation level that is inferior to the aggregation level for which a different distinct value of the grouping field is selected:

replacing the existing result table for the aggregation level with a result table in which the aggregatable value is aggregated, for each distinct value of the grouping field specified by the aggregation level, from all of the records of the source table having the selected value of the grouping field specified by the aggregation level that is superior to the aggregation level and inferior to the largest number of other aggregation levels, and selecting a distinct value of the grouping field specified by the aggregation level that occurs in a record of the source table having the selected value of the grouping field specified by the aggregation level that is superior to the aggregation level and inferior to the largest number of other aggregation levels.

2. The method of claim 1, further including the step of receiving a designation from a user designating an aggregation level and a distinct value of the grouping field specified by the designated aggregation level, and wherein the step of selecting a different distinct value of the grouping field specified by one of the aggregation levels includes the step of selecting the designated value of the grouping field specified by the designated aggregation level.

3. A method for producing a hierarchical table set from a basis table comprised of records which are in turn comprised of fields in response to a multiple level aggregation query that specifies an aggregated field of the basis table and a plurality of logically ordered levels, each level being either higher or lower than the other levels, at least one level specifying a grouping field of the basis table, comprising the steps of:

for each level specified by the query, creating an output table having an aggregation field corresponding to the aggregated field specified by the query, a primary grouping field corresponding to the grouping field if specified by the query for the level, and, for levels other than the highest level, one or more secondary grouping fields each corresponding to the grouping fields specified by the query for levels higher than the level;

for each row of the basis table, for each of the output tables:

if no record exists in the output table whose grouping field values exist and match the corresponding grouping fields in the row of the basis table, creating a record in the output table whose grouping field values match the values of the corresponding grouping fields in the row of the basis table, aggregating the aggregated field value of the basis table record into the aggregation field of the output table record whose grouping field values exist and match the values of the corresponding grouping fields in the row of the basis table, and aggregating the aggregated field value of the basis table record into the aggregation field of the output table record when no grouping field is specified;

displaying data from each table of the hierarchical table set in a display window by:

displaying the primary grouping field if the primary grouping field exists and the aggregation field of at least a portion of the records in the output table for the highest level; and for each output table besides the output table for the highest level; and selecting a record of the output table for the next-higher level as the current record of the output table for the next-higher level, and displaying the primary grouping field and the aggregation field of at least a portion of the records in the output table for the level that match the primary grouping field value and secondary grouping field values of the current record of the output table for the next-higher level;

selecting an output table to scroll;

selecting a different current record of the selected output table; and displaying the primary grouping field and the aggregation field of at least a portion of the records of the output table for the next-lower level from the level of the selected output table that match the primary grouping field value and secondary grouping field values of the current record of the output table for the next-higher level.

4. The method of claim 3, further including the step of displaying an indication that the selected record in the selected output table is the current record in the selected output table.

5. The method of claim 3, further including the steps of, for each output table for a level lower than the next-lower level from the level of the selected output table:

displaying the primary grouping field and the aggregation field of at least a portion of the records in the output table that match the primary grouping field value and secondary grouping field values of the current record of the output table for the next-higher level; and selecting a record of the output table as the current record of the output table.

6. A method in a computer system for generating a database query result having two levels of aggregation, comprising the steps of:

(a) receiving a database query specifying a first-level aggregation and a second-level aggregation;

(b) in response to the database query, generating a first-level result table and a second-level result table;

(c) representing the first-level aggregation in the first-level result table, wherein the representation of the first-level aggregation in the first-level result table comprises a plurality of component aggregations, one of which is selected;

(d) representing the second-level aggregation in the second-level result table including subsetting the second-level aggregation based upon the identity of the selected component aggregation of the representation of the first-level aggregation, wherein the representation of the second-level aggregation in the second-level result table comprises a plurality of component aggregations;

(e) displaying a portion of the plurality of component aggregations of the representation of the first-level aggregation in the first-level result table; and (f) displaying a portion of the subsetted plurality of component aggregation of the representation of the second-level aggregation in the second-level result table.

7. A method in a computer system for generating a database query result having two levels of aggregation, comprising the steps of:

(a) receiving a database query specifying a first-level aggregation and a s second-level aggregation;

(b) in response to the database query, generating a first-level result table and a second-level result table;

(c) representing the first-level aggregation in the first-level result table, wherein the representation of the first-level aggregation in the first-level result table comprises a plurality of component aggregations, one of which is selected;

(d) representing the second-level aggregation in the second-level result table including subsetting the second-level aggregation based upon the identity of the selected component aggregation of the representation of the first-level aggregation;

(g) selecting a different component aggregation of the first-level result table; and (h) resubsetting the second-level aggregation based upon the identity of the component aggregation selected in step (g).

8. The method of claim 7 wherein the component aggregations of both the first-level result table and the second-level result table each have a grouping value, and wherein step (h) includes the step of resubsetting the second-level aggregation to include only component aggregations of the second-level result table whose grouping values match that of the component aggregation of the first-level result table selected in step (g).

9. A method in a computer system for displaying a result of a query that specifies multiple levels of categories, the levels being hierarchically organized from a higher level to a lower level, each level having one or more categories such that each category of a level is a sub-category of a category of a higher level, comprising:

for each level, displaying the categories that are sub-categories of a selected category of a next higher level;

receiving a selection of a different category for a certain level; and in response to the selection and for each level that is lower than the certain level, re-displaying the categories of that level that are sub-categories of the selected category of the next higher level so that as a different category is selected for a certain level the categories of lower levels are updated to reflect the selected category.

10. The method of claim 9 wherein the steps of displaying, receiving, and re-displaying are performed by a front-end to a query engine and in response to receiving the selection, the front-end requests that the query engine supply the sub-categories of the selected category at the next level lower than the certain level.

11. A computer-readable memory device for controlling a computer system to display a result of a query that specifies multiple levels of categories, the levels being hierarchically organized from a higher level to a lower level, each level having one or more categories such that each category of a level is a sub-category of a category of a higher level, comprising:

for each level, displaying the categories that are sub-categories of a selected category of a next higher level;

receiving a selection of a different category for a certain level; and in response to the selection and for each level that is lower than the certain level, re-displaying the categories of that level that are sub-categories of a selected category of the next higher level so that as a different category is selected for a certain level the categories of lower levels are updated to reflect the selected category.

* * * * *